United States Patent [19]
Lehman

[11] Patent Number: 6,007,023
[45] Date of Patent: Dec. 28, 1999

[54] CABLE RESTRAINT SYSTEM FOR AIRCRAFT ENGINE RUN-UP TESTS

[75] Inventor: Dale L. Lehman, Valencia, Calif.

[73] Assignee: Lockheed Martin Corporation, Palmdale, Calif.

[21] Appl. No.: 09/115,218

[22] Filed: Jul. 13, 1998

[51] Int. Cl.[6] .................................................. B64F 1/12
[52] U.S. Cl. ..................... 244/110 R; 244/63; 244/115
[58] Field of Search ............................ 244/114 R, 114 B, 244/115, 110 R, 110 C, 63

[56] References Cited

U.S. PATENT DOCUMENTS

| | | | |
|---|---|---|---|
| 2,469,659 | 5/1949 | Martin | 244/115 |
| 2,608,363 | 8/1952 | Shumaker | 244/114 B |
| 3,311,329 | 3/1967 | Lakitsky | 244/63 |
| 3,366,353 | 1/1968 | Jackson | 244/110 R |
| 3,904,154 | 9/1975 | Jones | 244/110 R |

FOREIGN PATENT DOCUMENTS

| | | | |
|---|---|---|---|
| 617573 | 2/1927 | France | 244/115 |

*Primary Examiner*—Galen L. Barefoot
*Attorney, Agent, or Firm*—Robert A. Schruhl

[57] ABSTRACT

The invention is a cable restraint system for an aircraft having first and second main landing gears equally spaced from the longitudinal axis of the aircraft; the system for securing the aircraft from movement during engine run-up testing when the aircraft is positioned such that the main landing gears are in front of and the longitudinal axis thereof is aligned with a ground attachment fitting mounted to the ground. In detail, the system includes first and second coupling members. First and second cables having first and second ends, have their first ends attachable to the ground attachment fitting and the second ends attached to the first and second coupling members, respectively. A third cable is attached by its ends to the first and second coupling members. Fourth and fifth cables having first and second ends, are attached by their first ends to the first and second coupling members and attachable by their second ends main landing gears. When installed with the first ends of first and second cables attached to ground attachment fitting and the second ends of the fourth and fifth cables attached to the main landing gear, the system has a generally Y shape with the fourth and fifth cables forming the arms of the Y and the first, second and third cables forming a triangular shaped leg of the Y.

9 Claims, 3 Drawing Sheets

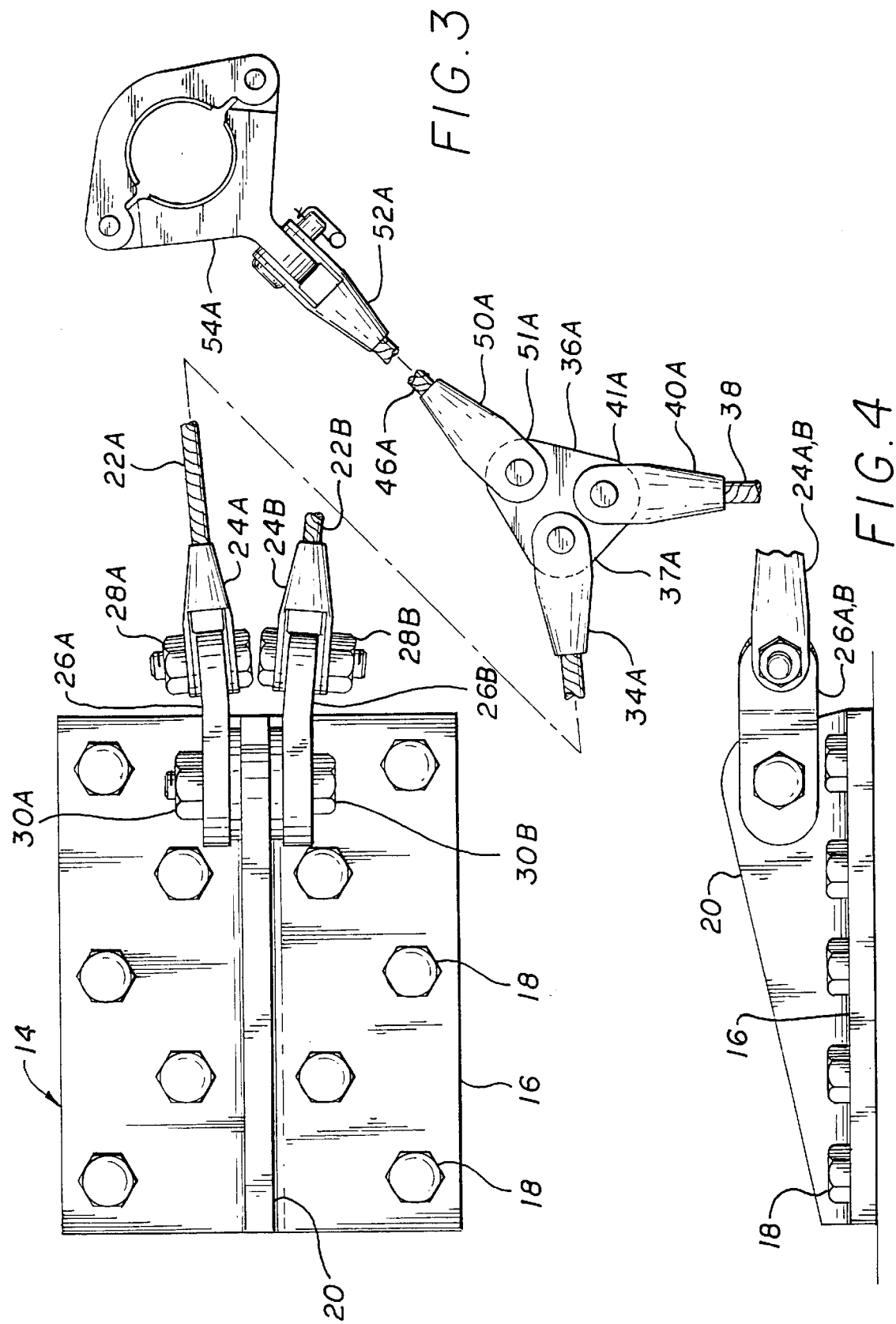

CABLE RESTRAINT SYSTEM FOR AIRCRAFT ENGINE RUN-UP TESTS

BACKGROUND OF THE INVENTION

1. Field of the Invention

The invention relates to the field of aircraft restraining systems and, in particular, to a cable restraint system for an aircraft for use during engine run up tests.

2. Description of Related Art

After repair or replacement of an engine in an aircraft, it is necessary to check out engine performance on the ground prior to any flight test. During these tests, it is often required that the engines be run at or near full power and it is therefore necessary to physically restrain the aircraft. On early aircraft designs having non-retractable landing gear wherein the wheels are connected by a common shaft, restraint systems as disclosed in French Patent No. 617,573 by. M. Dauvin could be used. The aircraft is restrained by a vertical "Y" shaped member having the center member or leg of the Y either driven into the ground or encased in concrete. The "harms" of the Y are pivotally connected to the common landing gear shaft in proximity to the wheels, and to the center member. Additionally, three cables are attached by one of their ends to the center member and extend radially outward therefrom, having their second ends attached to pins inserted into the ground. While such a system will work, it is totally unusable with aircraft using retractable tricycle landing gear, thus eliminating its use on virtually all modern aircraft.

Of course, wheel chocks cannot be seriously considered for use during part or full power engine run-up tests because of the danger that they may move or that the wheels will ride-up and over them, especially if they are not properly positioned. Separate cables attached to each main landing gear, as disclosed in U.S. Pat. No. 2,469,659 "Tethering Device For Airplanes" by J. Martin, have been used, but the storage and tracking of separate cables is a drawback. In addition, on aircraft such as the F-117 Night Hawk aircraft, running two separate cables directly back to a ground attachment fitting at an acute angle can cause interference with the landing gear doors. The use of such cables or chains to hold the aircraft to the deck of an aircraft carrier is discussed in U.S. Pat. No. 3,904,154 "Securing System For Jet Engine Testing Of Aircraft" by F. W. Jones. Additionally, attempts to use tie-down rings on the main landing gear can also cause problems. For example, on the F-117 aircraft with tie-down rings off-set from the centerline of the gear, the cables when loaded during engine run-up can cause damage to the landing gear torque arms.

Thus, it is a primary object of the invention to provide an aircraft restraint system for engine run-up tests.

It is another primary object of the invention to provide an aircraft restraint system for engine run-up tests that is easy to attach to the aircraft.

It is a further object of the invention to provide an aircraft restraint system for engine run-up tests that is easy to store.

It is a still further object of the invention to provide an aircraft restraint for engine run-up tests that allows self alignment of the aircraft.

It is another object of the invention to provide an aircraft restraint system for engine run-up tests that includes tie down redundancy.

SUMMARY OF THE INVENTION

The invention is a cable restraint system for an aircraft of the type having a pair of main landing gears equally spaced from the longitudinal axis of the aircraft. The system's function is to secure the aircraft to an attachment fitting mounted on the ground and prevent movement thereof during engine run-up testing when the aircraft is positioned with the main landing gears positioned in front of and the longitudinal axis aligned with the attachment fitting.

In detail, the preferred system includes first and second coupling members, preferably in the form of triangular shaped flat plates. First and second cables are pivotally attachable by their first ends to the ground attachment fitting and pivotally attached by their second ends to the first and second coupling members, respectively, at one of the vertexes thereof. A third cable, having a length less than the distance between the two main landing gears, is pivotally attached by its ends to the second vertexes of the first and second coupling members. Fourth and fifth cables are pivotally attached by their first ends to the third vertexes of the first and second coupling members, respectively, and pivotally attachable by there second ends to the main landing gears, preferably to the main strut piston at a point above the wheels.

When the system is installed with the first ends of the first and second cables attached to the attachment fitting that is secured to ground and the second ends of the fourth and fifth cables are attached to the main landing gear, the device generally has a Y shape with the fourth and fifth cables forming the arms of the Y and the first, second and third cables forming the triangular shaped leg of the Y.

Thus it can be seen that when the device is installed, the aircraft will self center about the ground attachment fitting during engine run-up tests, even if there is differential thrust from a multiple number of engines mounted offset from the longitudinal axis. In addition, should one of the cables fail, the aircraft would still be prevented from moving. Finally, by attaching to the main landing gears above the wheels, pitching forces tending to rotate the aircraft about the wheels, engine thrust forces absorbed by the nose landing gear are reduced. In addition, on certain aircraft, such as the F-117A, the general Y shape of the device prevents any of the cables from interfering with landing gear doors.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 3 is a is an enlarged partial planform view of the cable restraint system shown in FIG. 1, particularly illustrating the cable restraint system attached to a ground attachment fitting.

FIG. 4 is a side view of the ground attachment fitting shown in FIG. 3.

DESCRIPTION OF THE PREFERRED EMBODIMENT

Figure 1:
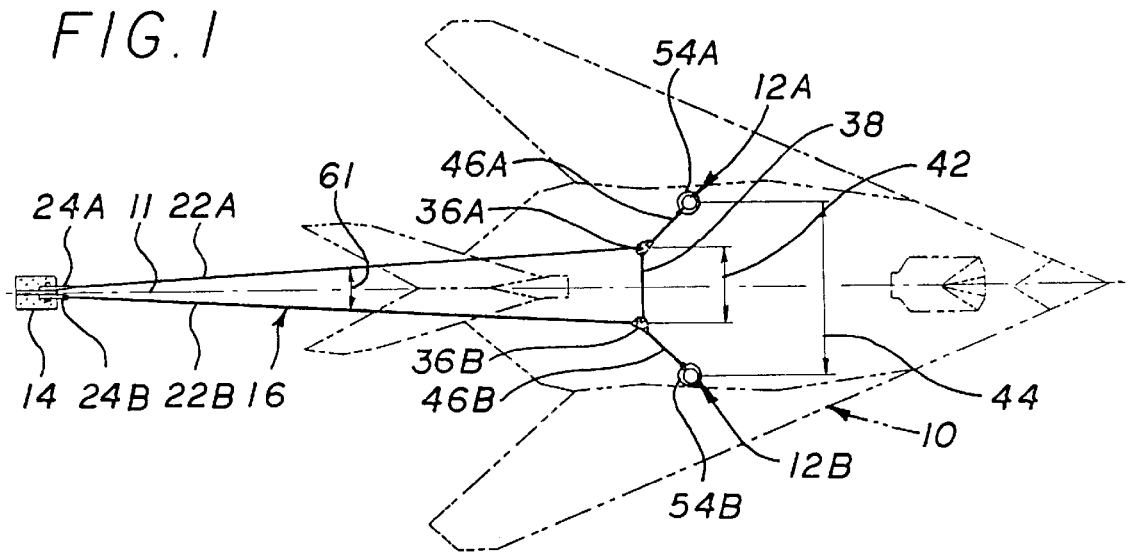
FIG. 1 is a planform view of an aircraft with the cable restraint system installed.

Illustrated in FIG. 1 is an aircraft, generally indicated by numeral 10, having a longitudinal axis 11 and main landing gears 12A and 12B equally spaced therefrom. In order to conduct engine run-up tests, the aircraft 10 is positioned in front of a ground attachment fitting 14 with its longitudinal axis 11 aligned therewith. A cable restraint system 16 is illustrated attached to both the main landing gears 12A and 12B and to the attachment fitting 14. Particularly, referring to FIGS. 3 and 4, the attachment fitting 14 includes a base plate 16 secured to the ground by bolts 18 and incorporating a vertical plate or lug 20.

Figure 2:
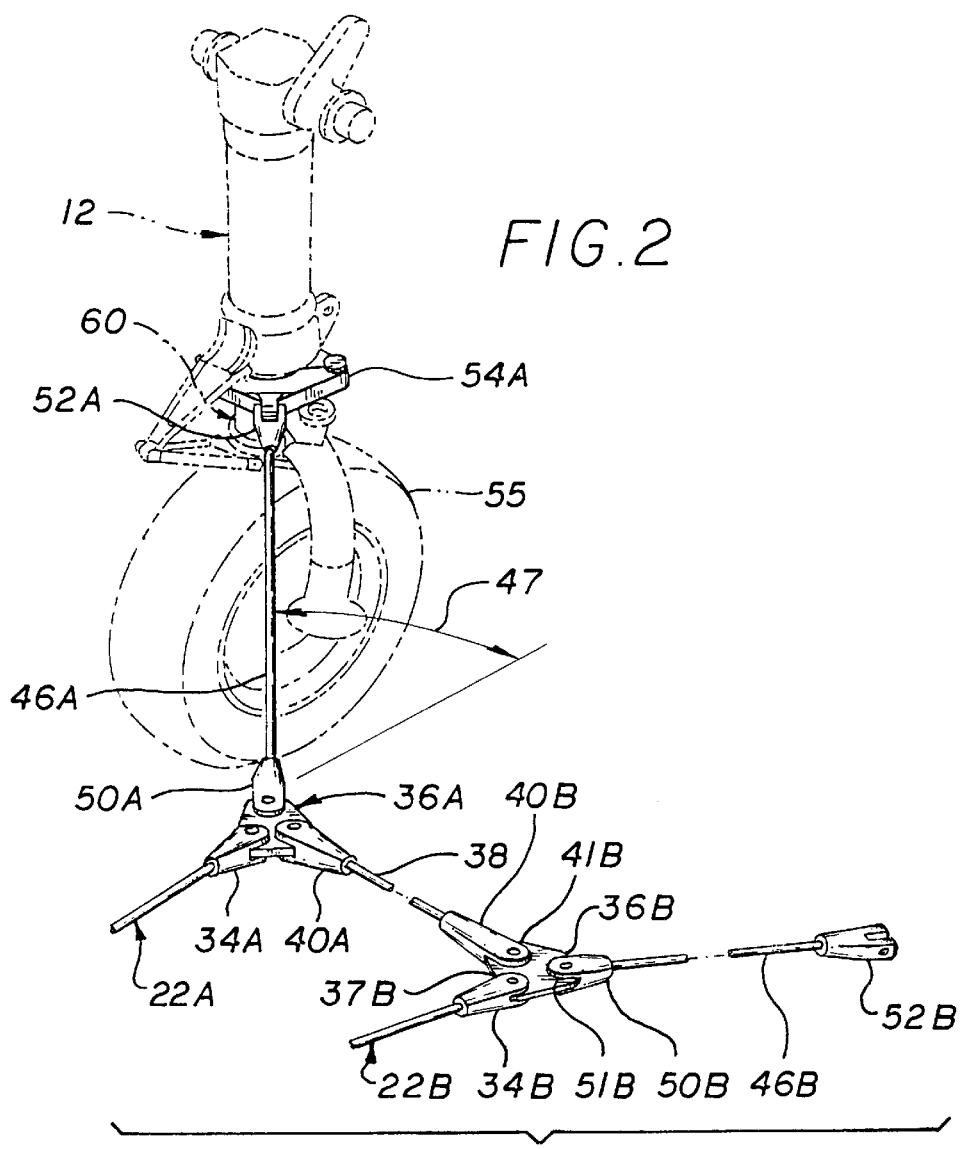
FIG. 2 is a is partial perspective view of one of the main landing gears and cable restraint system illustrated in FIG. 1.

Still referring to FIGS. 1, 3 and 4, additionally to FIG. 2, the cable restraint system includes first and second cables 22A and 22B having first ends that terminate in devises 24A and 24B which are rotatably attached to links 26A and 26B by fastener assemblies 28A and 28B. The links 26A and 26B are, in turn, connected to the lug 20 by fastener assemblies 30A and 30B. Thus the devises 24A and 24B are free to rotate in a vertical plane. The particular ground attachment fitting 14 is illustrated by way of example only, and other designs could be used, preferably allowing devises 24AB to rotate in a vertical plane. Thus the attachment fitting 14 is not particularly germane to the invention. However, any such fitting must be capable of attaching to the devises 24AB, although, the cable ends can be modified to attach to any fitting without deviating from the scope of the invention.

The opposite ends 32A and 32B of the cables 22A and 22B also terminate in devises 34A and 34B that are pivotally attached to triangular shaped coupling members 36A and 36B, respectively, at first vertexes 37A and 37B, and thus can rotate in a plane parallel to the coupling members (parallel to the ground when installed). A third cable 38 having ends also terminating in devises 40A and 40B is pivotally connected to the coupling members 36A and 36B at vertexes 41A and 41B. The Cable 38 has a length, indicated by numeral 42, that is less than the distance, indicated by numeral 44, between the main landing gears 12AB.

Fourth and fifth cables 46A and 46B have first ends that terminate in devises 50A and 50B, which are pivotally connected to the coupling members 36A and 36B, respectively, at vertexes 51A and 51B. The cables 46AB have second ends that terminate in Clevises 52A and 52B pivotally connected to clamps 54A and 54B that releasably engage the strut pistons 60 of the main landing gears 12AB above the wheels (only the strut piston 50 and wheel 55 of main landing gear 12A is illustrated in FIG. 2). Thus devises 50AB rotate in the plane of the coupling members 36AB and devises 52AB rotate in a vertical plane when the cable assembly 16 is installed as illustrated.

The lengths of the cables 22AB, 38 and 46AB are selected so that the angle, indicated by numeral 47 of cables 46A and 46B are generally at a 45 degree angle to the longitudinal axis 11 of the aircraft 10 and the angle between cables 22AB, indicated by numeral 61 is in the range of 30 degrees or less. It should be understood that while solid cables are illustrated, the cables could consist of chains. Furthermore, if chains were to be used, a single link in the chains could serve as a coupling members 36AB. Thus the use of a solid cable in the drawings should not be construed as a limitation. In addition, while triangle shaped coupling members are preferred because they provide separation and alignment of the cables 22AB, 38 and 46AB, other shapes could be used such as a simple ring.

Figure 5:
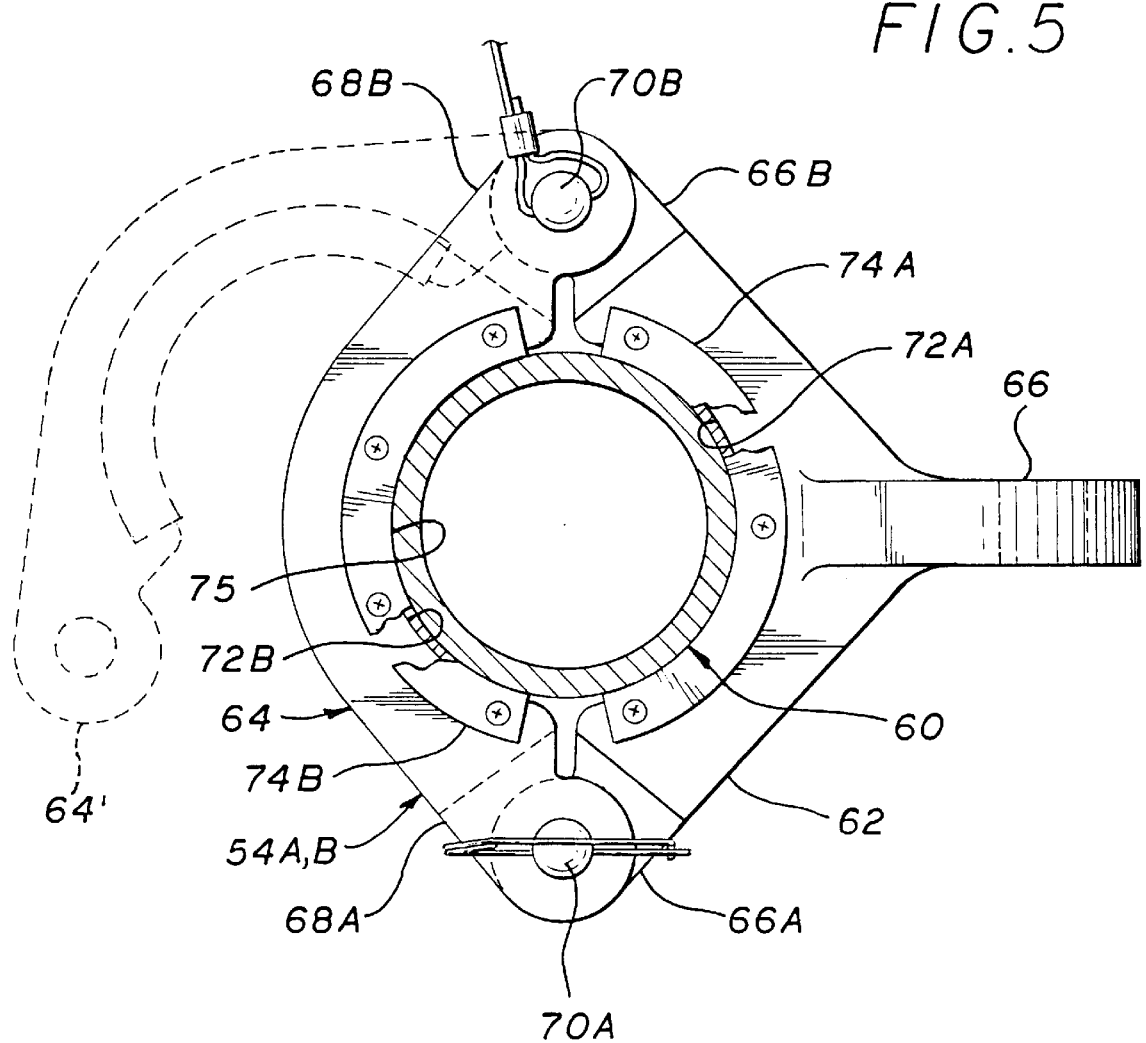
FIG. 5 is a planform view of the landing connect fitting for the cable restraint system illustrated in FIG. 3.
Figure 6:
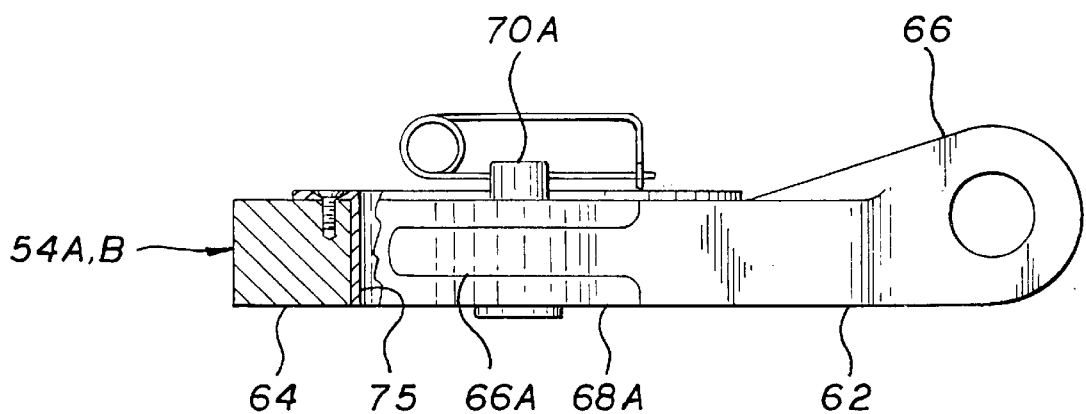
FIG. 6 is a side view of the landing gear connect fitting illustrated in FIG. 5.

Referring to FIGS. 5 and 6, each of the clamps 54AB include first and second "C" shaped clamp halves 62 and 64. Clamp halve 62 includes a center lug 66 that is pivotally joined to the devises 52AB of the cables 46AB, and further includes end lugs 66A and 66B. The clamp halve 64 includes end devises 68A and 68B for receiving the lugs 66A and 66B and which are secured by fastener assemblies 70A and 70B. The circular shaped inner surfaces 72A and 72B of the clamp halves 62 and 64 are lined with low friction protective covers 74A and 74B to prevent damage to the surface of the shock strut piston 60 and, of course, form an almost complete circular surface 75 for griping the strut piston when installed thereon. One need only remove one of the fastener assemblies 70A to un-clamp the cable restraint assembly 16 from the aircraft 10 by rating clamp halve 64 to the position shown in dotted lines and indicated by numeral 64'.

Thus it can be seen that the cable restraint system not only is easily installed, but provides self-alignment of the aircraft during engine run-up. This is especially important in multi-engine aircraft, because the engines may not produce the same power and/or when attempting single engine run-ups. In addition, there is redundancy if a cable should break. The use of flexible cables 22AB, 38 and 46AB also allows easy storage.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

Industrial Applicability

The invention has applicability to the aircraft industry.

I claim:

1. A cable restraint system for an aircraft having first and second main landing gears equally spaced from the longitudinal axis of the aircraft; the device for securing the aircraft from movement during engine run-up testing when the aircraft is positioned such that the main landing gears are positioned in front of and the longitudinal axis thereof is aligned with a ground attachment fitting mounted on the ground, the system comprising:

first and second cables having first and second ends, said first ends attachable to the ground attachment fitting;

a third cable having first and seconds coupled to said second ends of said first and second cables, respectively; and fourth and fifth cables having first and second ends, said first ends coupled to said second ends of said first and second cables and said first and second ends of said third cable, and second ends of said fourth and fifth cables attachable to said first and second main landing gears, respectively.

2. The system as set forth in claim 1 further comprising:

first and second coupling members;

said second ends of said first and second cables attached to said first and second coupling members, respectively;

said first and second ends of said third cable attached to said first and second coupling members, respectively; and said first ends of said fourth and fifth cables attached to said first and second coupling members, respectively.

3. The system as set forth in claim 2 comprising said first and second cables pivotally attachable by their first ends to the ground attachment fitting and pivotally attached by said second ends to said first and second coupling members, respectively.

4. The system as set forth in claim 2 comprising said ends of third cable pivotally attached to said first and second coupling members.

5. The system as set forth in claim 2 comprising said fourth and fifth cables pivotally attachable by their first ends to said first ends to said first and second coupling members, respectively and by their second ends to the main landing gear, respectively.

6. The system as set forth in claim 1, or 2, or 3, or 4, or 5, wherein the distance between the first and second landing gear is greater than the length of said third cable.

7. The system as set forth in claim 6 wherein said first and second ends of said third, fourth and fifth cables and said seconds of said first and second cables pivot in a plane generally parallel to the ground when the system is connected to the attachment fitting and the main landing gear.

8. The system as set forth in claim 7 comprising:

said first and second coupling members are triangular shaped having three vertexes;

said second ends of said first and second cables pivotally attached to one of said vertexes of said first and second triangular shaped coupling members;

said first and second ends of said third cable pivotally attached to the second of said three vertexes of said first and second triangular shaped coupling members; and said first ends of said fourth and fifth cables pivotally attached to the third of said three vertexes of said first and second triangular shaped coupling members.

9. The system as set forth in claim 8 where in the first and second main landing gears includes a wheel mounted on the end of a piston strut and said second ends of said fourth and fifth cables are attachable to said struts at a point above the wheels.

\* \* \* \* \*